Figure 1:
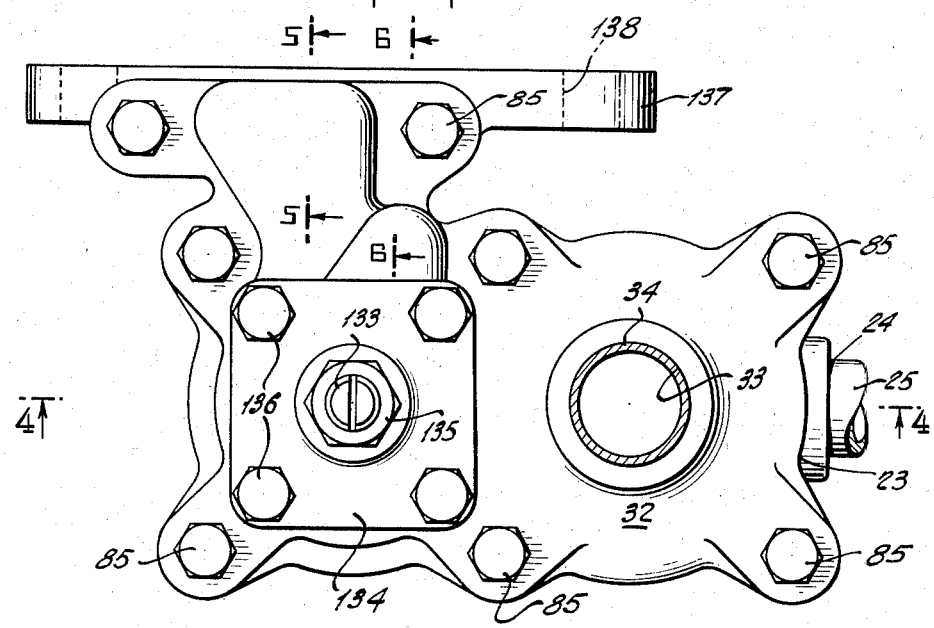

July 28, 1959 E. A. ROCKWELL 2,896,666
BRAKE VALVE MECHANISM
Filed July 2, 1954 4 Sheets-Sheet 1

INVENTOR
EDWARD A. ROCKWELL.
BY
Arthur Wright
ATTORNEY

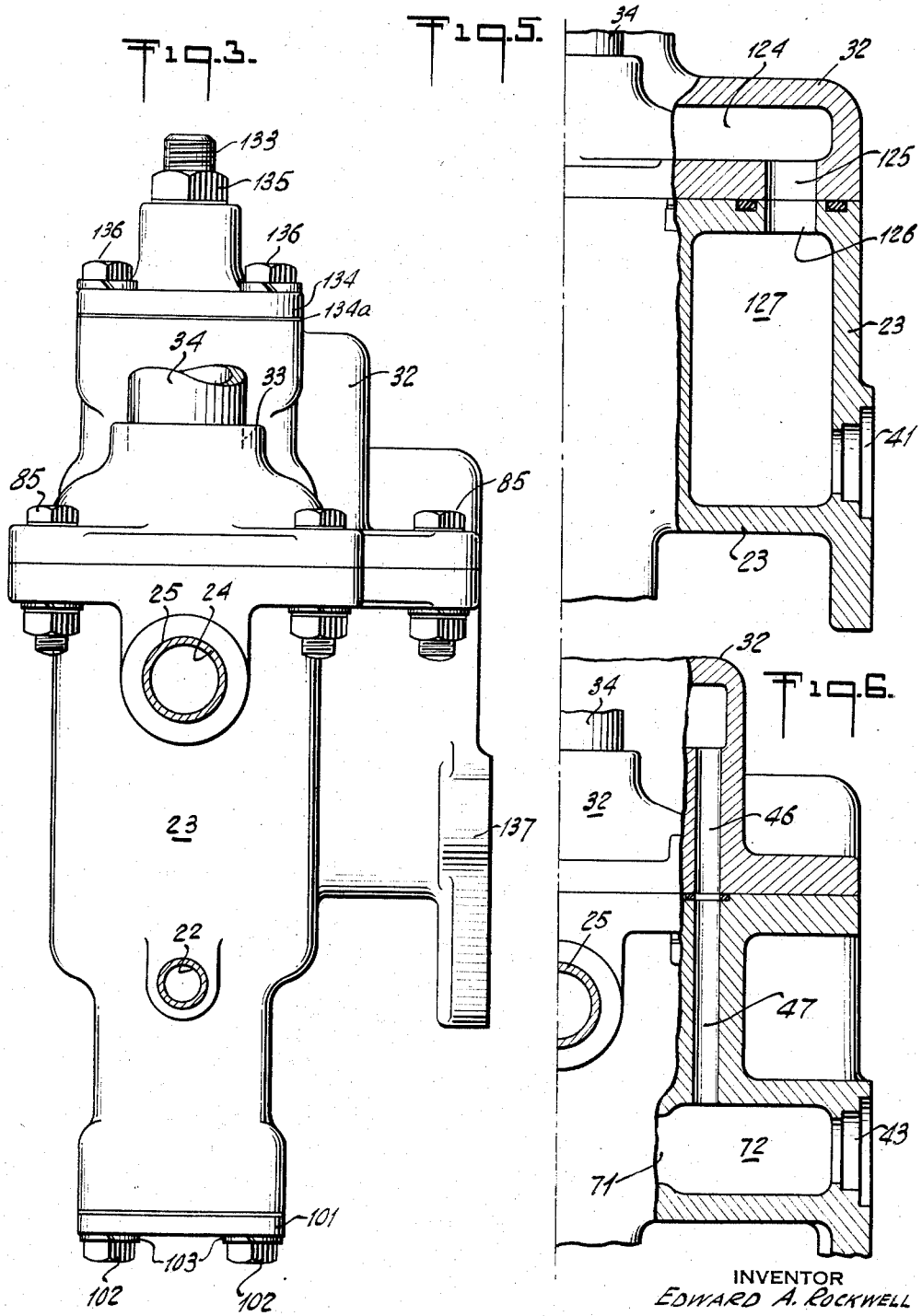

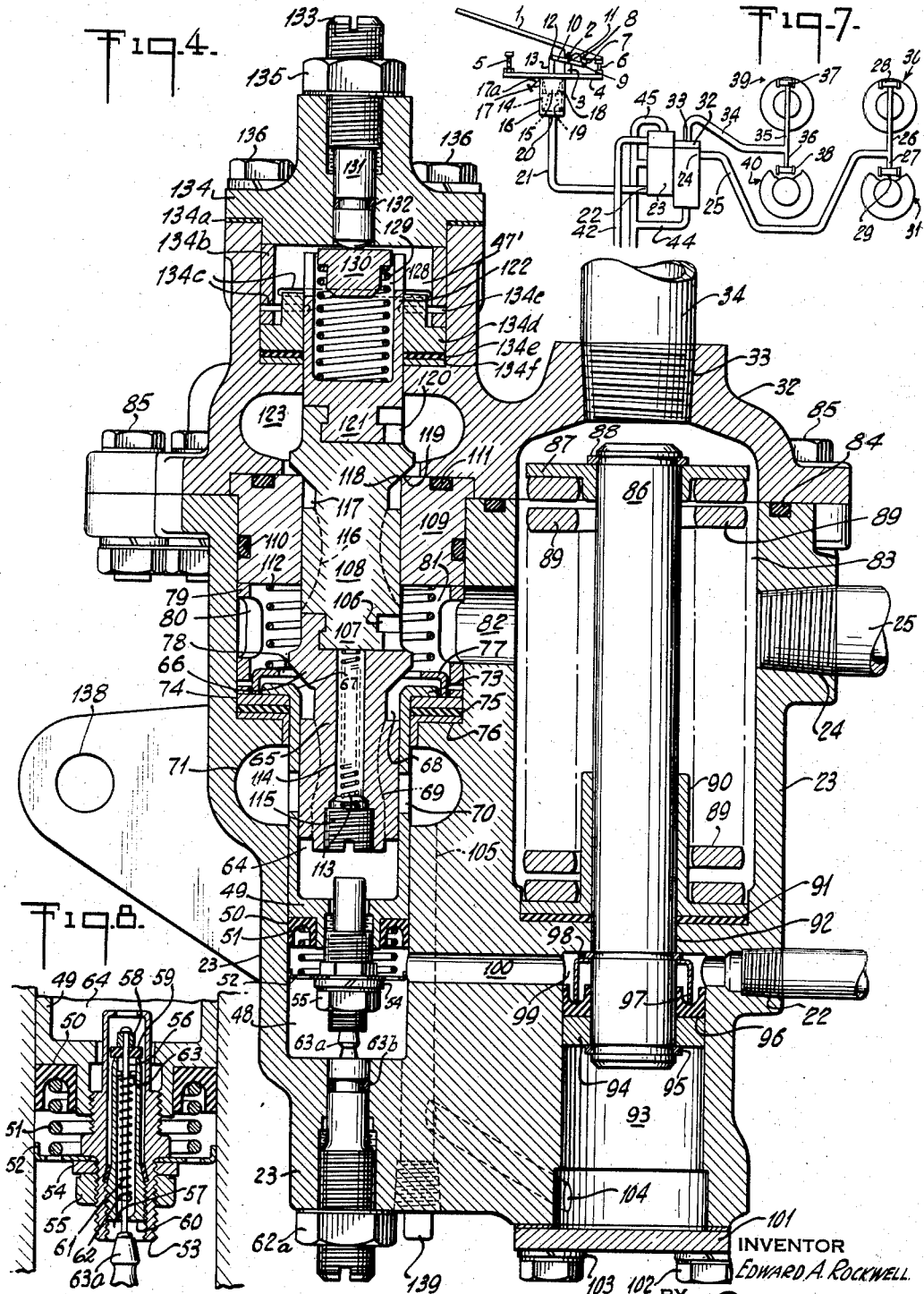

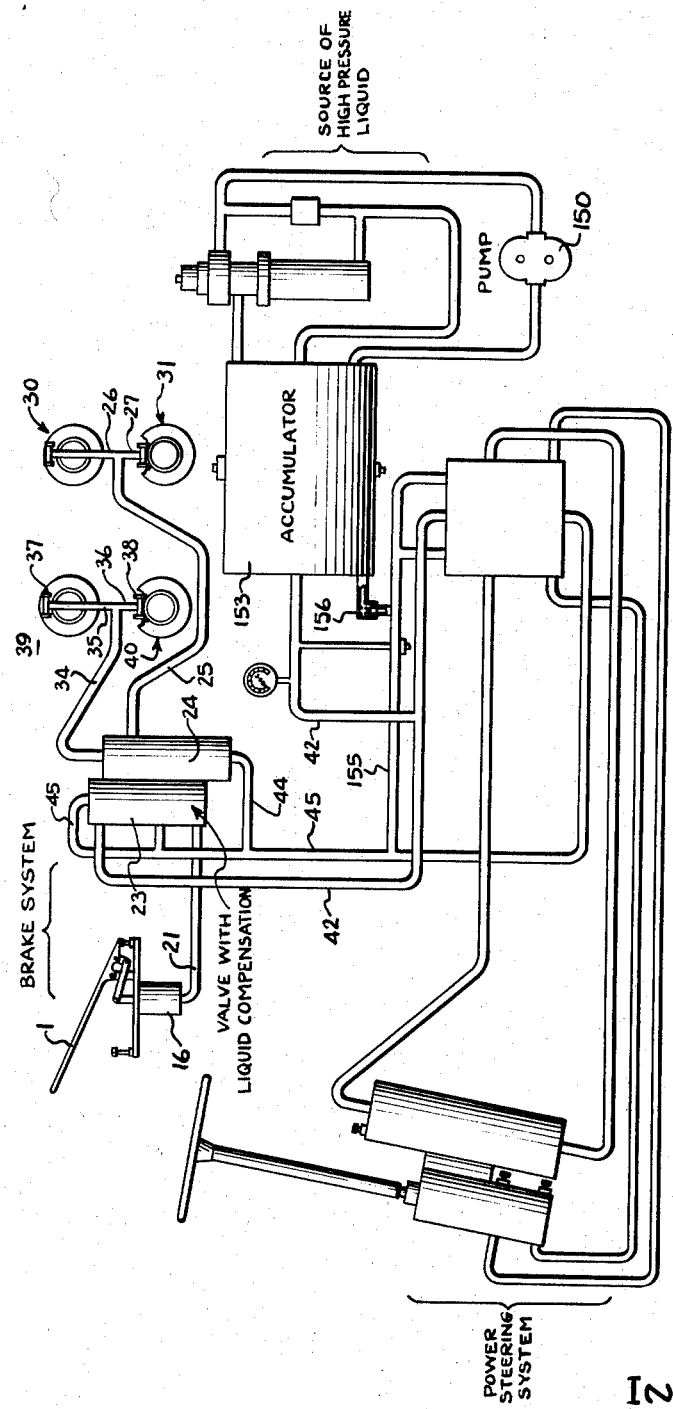

United States Patent Office 2,896,666
Patented July 28, 1959

2,896,666
BRAKE VALVE MECHANISM
Edward A. Rockwell, Los Angeles, Calif.
Application July 2, 1954, Serial No. 440,995
16 Claims. (Cl. 137—622)

My invention relates to hydraulic control systems and more particularly to a system having a valve mechanism applicable especially to the operation of automotive accessories, as for instance automobile and airplane brakes.

One object of this invention is to provide a system, such as a brake control system, for automotive vehicles having a manual pressure operated control valve for controlling the supply of high-pressure fluid from a source to the devices to be controlled, such as the brake cylinders.

A further important object is to provide liquid compensation valve means in association with the control valve to maintain the manual pressure system filled with fluid derived from the high pressure fluid source.

Another object of my invention is to provide a brake valve mechanism capable of general application, but which is especially applicable in the operation of automotive vehicle accessories, such for instance as automobile brakes, so as to maintain an adequate and exact control over the same. Another object is to provide a brake valve mechanism which is designed and arranged to operate in connection with the system disclosed in my copending application upon Power Steering System, executed August 26, 1946, Ser. No. 440,993, filed July 2, 1954, and which is also designed and intended to be operable in connection with the brake pedal mechanism disclosed in my copending application upon Brake Pedal Mechanism, executed May 10, 1946, Ser. No. 440,996, filed July 2, 1954, both of which applications may be considered a part of the disclosure herein. A further object is to provide a valve mechanism which effectively controls the brakes or other accessories, owing especially to the means therein for coordinating the travel of the manual controlling means with the increase of pressures applied from a source of power, as for instance a hydraulic liquid under pressure. A further object is, accurately, to move the valves in the valve mechanism in such a manner as to avoid any lack of uniformity in the operation thereof. Another object is to provide effective liquid compensation in moving the valve, and in which means is provided to maintain the manually moved actuator fluid line filled with liquid from the pressures existing within the valve. Further objects of my invention will appear from the detailed description of the same hereinafter.

Another object is to provide an improvement upon the Brake Valve disclosed in my Patent No. 2,505,578, dated April 25, 1950, as well as my patent on the Fluid Pressure Valve, No. 2,459,456, dated January 18, 1949, original filed June 4, 1943, wherein the present invention provides a hydraulic travel coordinating device in place of the mechanical arrangement shown in the said Patent No. 2,505,578, in combination with a hydraulically-operated valve substantially balanced as to pressures in the operation thereof as distinct from the reaction type of construction shown in the patent No. 2,459,456.

While my invention is capable of being carried out in many different ways, for the purpose of illustration I have shown only one embodiment of my invention in the accompanying drawings, in which—

Figure 2:
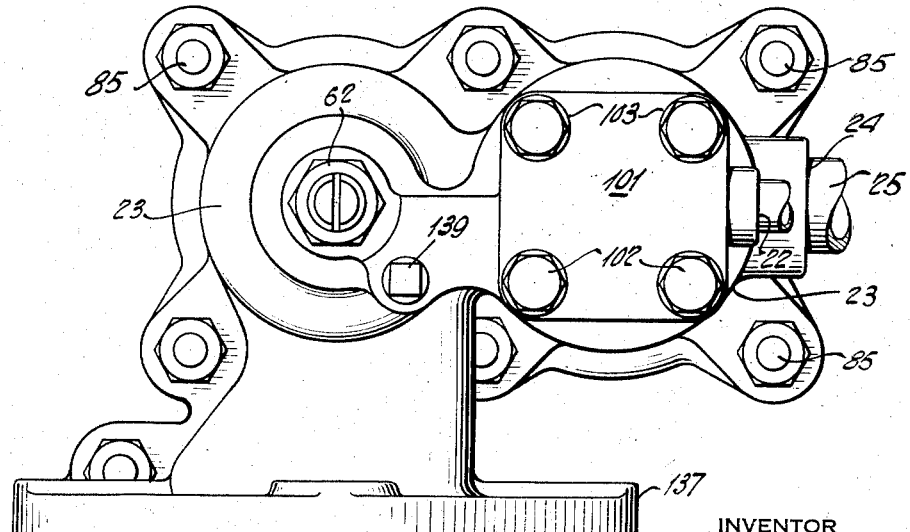

Fig. 1 is a plan view of the hydraulic brake operating valve made in accordance with my invention;

Fig. 2 is an underneath view of the same;
Fig. 3 is an elevation of the said valve;
Fig. 4 is a vertical section thereof taken on line 4—4 of Fig. 1;
Fig. 5 is a vertical section thereof taken on line 5—5 of Fig. 1;
Fig. 6 is a vertical section thereof taken on line 6—6 of Fig. 1;
Fig. 7 is a diagrammatic representation of a brake valve mechanism made in accordance with my invention, as applied to the operation of brake cylinders under the control of a treadle-operated master cylinder;
Fig. 8 is an enlarged vertical cross-section of the liquid compensating valve; and
Fig. 9 is a diagrammatic view of a hydraulic control system for the control of the steering and brake mechanism of an automotive vehicle by means of power, and including the brake valve mechanism shown in the above figures.

In the drawings, I have shown a treadle 1 mounted on a pivot 2 carried in a pair of ears 3 which project upwardly from a base plate 4 supported in any desired way, as for instance from a floor-board of an automobile (not shown), said plate having an adjustable forward screw stop 5 and an adjustable rearward screw stop 6 for cooperation with the ends of the treadle 1. A pair of links 7 are connected to a pivot 8 in the underneath part of the treadle 1, said links having a pivotal connection 9 to a lever 10 which is supported by a pivot 11 from the ears 3. The forward end of the link 10 has a pivotal connection 12 to a piston rod 13 carried in a socket 14 of a master cylinder piston 15 in a master cylinder 16. The cylinder 16 has a removable air bleeder screw 17, carried in a screw-threaded apertured sleeve 17a, for releasing accumulated air. Between the piston 15 and the cylinder 16 there is a tapered annular rubber, or rubber substitute, seal 18 and said piston 15 is retracted by means of a conical spring 19 interposed between the piston 15 and the base of the cylinder 16. An outlet port 20, in the bottom of the cylinder 16, is connected, by means of a liquid control line pipe 21, from the master cylinder 16, as shown in Fig. 7, to a port 22, in a lower valve casing 23, which may be connected to the usual liquid compensated master cylinder (not shown) but when so used, the compensation inlet valve shown in Fig. 8 would not be used. The said lower valve casing 23, also, has therein a hydraulic pressure system including an outlet or working port 24 which is connected by a pipe 25 to branch pipes 26 and 27 leading, respectively, to wheel cylinders 28 and 29 for operating rear wheel brakes 30 and 31, of the automobile. Above the lower valve casing 23 there is located an upper valve casing, or cover, 32, which has an outlet port 33 connected by a pipe 34 to branch pipes 35 and 36 which are connected, respectively, to brake cylinders 37 and 38 on front wheel brakes 39 and 40, respectively, of the automobile. On the lower valve casing 23 there is, also, a hydraulic high pressure inlet port 41 (Fig. 5) leading from any suitable source of liquid Fig. 9 under a constantly supplied uniform high pressure, as for instance from a gear pump 150 which is connected to a hydraulic high pressure inlet pipe 42 (Figs. 7, 9). Furthermore, on the said lower valve casing 23 there is a discharge or low pressure outlet or return port 43 (Fig. 6) which leads to discharge pipe 44. As shown in Figs. 5 and 6 the chamber 72 having the outlet or return port 43 is in communication with a chamber in the cover 32 by means of passages 46, 47, which latter chamber is in communication with the end 47' of the bore in that part of the valve casing that receives the valve element. The connection provided by the passages 46, 47 is depicted diagrammatically in Fig. 7 as line 45, shown connected to the return line 155, which line 45 functions as a balancing passage as will be later described.

The pipe 21 from the master cylinder or impulser 16 provides liquid under a manual pressure, which enters a lower chamber 48 in the lower valve casing 23 for operating a lower valve sleeve actuator plunger or piston 49. The valve piston 49 has on its lower face an annular rubber seal 50 supporting in a recess therein a helical spring 51, the lower end of which rests against an apertured disc 52 which is attached to the outside of a screw plug 53, by means of a washer 54 and a screw-threaded nut 55, in the piston 49. In the plug 53 there is a headed liquid compensation valve stem 56 extending through a passageway 57 in the screw plug 53. This liquid compensation valve is especially desirable when the usual liquid compensation for a master cylinder (not shown) on the inlet 22 is not present. The said valve stem 56 has thereon a liquid compensation valve 58 which seats againts a rubber or rubber substitute valve seat member 59, which is supported on a sleeve 60 screw-threaded in the bottom of the plug 53. The valve stem 56 has thereon a spring 61 between a stop 62 on the stem 56 and a spider 63. The spring 61 effectively acts against an adjustable stop 63a tending, normally, to raise the plunger 49 and normally seat the valve 58, 59. In the lowermost position of the valve piston 49, as shown in Fig. 4, which position of the plunger 49 is produced whenever the pressure in the line 21 leading to the master cylinder drops sufficiently to require additional liquid, the valve 58 is held off its seat 59, against the action of the spring 61, by means of the adjustable stop 63a which has its lower end screw-threaded into the lower part of the casing 23, where it is provided with a nut 62a to lock the same in adjusted position. A seal 63b, of rubber or similar material, is located around the stop 63a in the casing 23. In the operation of the system (Fig. 9), the pressure in the line 21 is held at a low but substantially constant residual pressure which is maintained in the return line to the high pressure liquid source and in the lines to the wheel cylinders, which residual pressure is effective to hold the seals in the lines and cylinders closed. In the present case the residual pressure is held in the return line 152 leading to the pump 150 via the accumulator 153 by the check valve 156. Whenever the pressure in the line 21 is substantially the same as said residual pressure the pressures acting on the opposed effective areas of the plunger 49 are substantially equal, and the plunger 49 is raised sufficiently to allow the liquid compensation valve 58 to close, due to the effect of the spring 61. Whenever the pressure drops in the line 21, due to a loss of fluid, or change in volume, the greater force acting against the upper surface of the plunger 49 forces the same downward to open the valve 58 allowing flow into the line 21.

The piston 49, furthermore, has a cylindrical chamber 64 to receive a lower valve plunger 65, which has a tapered outlet or discharge valve element 66 cooperating with a tapered valve seat 67 in the upper part of the chamber 64. The valve 66, 67 is arranged to communicate with an annular chamber 68 having flutings providing passageways 69 in the plunger 65 leading to peripheral openings 70 in the valve piston 49 and to the chamber 64. The openings 70 communicate with an annular port 71 provided with a horizontal passageway 72 (Fig. 6) that leads to the discharge port 43, the latter being in communication with the discharge passageways 46 and 47, as shown in Fig. 6. Adjacent to the tapered valve seat 67 the valve piston 49, furthermore, has a flange 73 overlying a washer 74 and an annular rubber seal 75 which is supported by a flange ring 76 acting as a guide or bushing for the valve piston 49. A spring-supporting ring 77, having a central aperture 78 and forming a yielding stop for retracting the piston 49, is located around the flange 73 so as to rest on the washer 74 and so as to be carried inside an apertured spacing sleeve 79 having peripheral apertures 80 leading to an annular delivery chamber 81 for the delivered high pressure hydraulic liquid, which is thence conveyed by a transverse working port 82 to a plunger chamber 83 and thence to the delivery port 24 leading to the wheel brake cylinders 28 and 29.

The plunger chamber 83 is, also, in communication, by the port 33, with the wheel brake cylinders 37 and 38. This plunger cylinder 83 has an annular rubber seal 84 adjacent to the upper valve casing 32, the casing 32 being arranged to retain the seal 84 in position by a series of fastening bolts 85 provided for fastening the casings 23 and 32 together. Within the plunger cylinder 83, furthermore, there is a pressure responsive plunger 86 having on its end a spring-retaining disc 87 held in place by a split ring 88. The disc 87 supports one end of a strong helical spring 89, the lower end of which is supported upon a flanged sleeve 90 carried in the bottom of the cylinder 83 by a rubber ring 91. The said plunger 86, furthermore, extends downwardly through an opening 92 into a cylinder 93, where it is provided with a travel-control piston head 94 held in place by a split ring 95. The piston ring 94, furthermore, supports a rubber lip seal 96 having a retaining ring 97 thereon which rests against a split stop ring 98 on the plunger 86. A travel-coordinating annular chamber 99 is thus provided above the piston ring 94, which is in communication by a passageway 100 with the chamber 48 beneath the valve piston 49. Also this annular chamber 99 communicates with the master cylinder inlet port 22. The lower end of the cylindrical chamber 93 is closed by a plate 101 held in place by screws 102 and lock washers 103. This cylinder 93, which acts as a breather or release chamber, is connected by an inclined passageway 104 to a vertical passageway 105 which is in communication with the annular discharge chamber 71.

Above the outlet valve 66, 67 there is a bayonet joint 106 for receiving a similarly shaped projection 107 on an inlet valve plunger 108 which is carried in a bushing 109 having annular rubber seals 110 and 111 against which the spacing sleeve 79 rests, and which acts as a support for a helical spring 112 supported by the ring 77. A small helical spring 113 is carried in a longitudinal passageway 114 in the valve plunger 65 between the lower end of the valve element 108 and a screw plug 115 for taking up any play or looseness between the valve plungers 65 and 108 which exists by virtue of the connection between these members. Thus the outlet or return valve head 66 is movable relative to the inlet valve head 118 and the guide member 122 to which said valve heads are connected. Obviously, the play or looseness between these parts allows the conical valve head 67 to accurately position itself relative to the valve seat 67. Furthermore, the valve plunger 108 has peripheral flutings 116 to provide passageways for communicating with the annular chamber 81 so as to bring the same into communication with an annular passageway 117 around a tapered valve 118 on the valve plunger 108 which cooperates with a valve seat 119 on the bushing 109. The upper end of the valve plunger 108, furthermore, has a bayonet joint 120 for attachment to a similar bayonet joint projection 121 on an upper valve piston 122, the bayonet joint 120, 121 being located in an annular inlet chamber 123 which communicates with a horizontal passageway 124 having a port 125 in the upper valve casing 32 so as to communicate with a port 126 leading to a chamber 127 in the lower valve casing 23 having therein the high pressure inlet port 41, as shown in Fig. 5. Furthermore, it will be noted that the said upper valve piston 122 has a cylindrical chamber 128 therein for receiving a helical spring 129, the upper end of which rests against an adjustable button 130, the position of which is adjusted by a rod 131 having a rubber seal 132 and a screw-threaded end 133 screw-threaded in the top of a cover plate 134, where it carries a locking nut 135. The cover plate 134 is separated from the casing 23 by a gasket 134a and rests against a spring sleeve 134b having alternating slits 134c to press against a ring 134d sealed by a rubber disc 134e on a washer 134f. Screws 136 fasten the cover plate 134 to the upper valve casing 32. It will be noted that the casing 32, furthermore, has a supporting plate 137 which may be provided with one or more holes 138 for attachment or support of the valve mechanism from any desired part of the automobile, as for instance a dash-board (not shown). Also, it will be noted that in order to provide the vertical passageway 105, this may be made from the lower part of the casing 23, and the opening thus formed closed by a screw plug 139.

In the operation of my invention, referring particularly to Fig. 7, pressure fluid is supplied to the wheel cylinders under control provided by the valve means contained within the housings 22, 32. One of the features of the invention is that the valve means provides "feel" for the manually operated treadle 1. To achieve this result, a piston 86 is mounted within the chamber 83 provided in the valve housing, and is subject to the pressure in the line leading to the wheel cylinders. This piston 86 moves the travel-coordinating piston element 94 to adjust the volume of the travel-coordinating chamber 93 in which the element 94 is located in accordance with the working pressure. The treadle therefore "feels" the variations in working pressure by virtue of the travel-coordinating chamber and the piston 86.

A further feature of the invention is the provision for maintaining the lines to the treadle filled with fluid derived from the source of high pressure fluid connected to the valve means. In carrying out this aspect of the invention, residual pressure is supplied from the return line 155 (Fig. 9) to the chamber 64 containing the liquid compensation valve 59 (Fig. 8). Normally the compensation valve 59 is closed so that upon application of treadle pressure the outlet valve comprised of the valve element 66 and the valve seat 67 carried by the plunger 49 is closed by the action of the plunger 49 in rising within the housing producing the lapped position of the valve means. Continued movement of the plunger opens the inlet valve 118 for application to the wheel cylinders. Upon release of treadle pressure, the valve plunger 49 moves rapidly downwardly, opening the outlet valve 66.

The liquid compensation valve 59 is opened in the retracted position of the treadle whenever the plunger 49 moves downwardly in response to a drop in the pressure in the line 21 causing the stem of the liquid compensation valve to hit the stop 63a. Fluid under residual pressure in the chamber 64, when the valve 59 is open, is allowed to flow into the line 21, to maintain the line filled. It will be understood that when it is desired to apply the brakes the treadle 1 will be pressed downwardly to the desired extent, thereby delivering the manual hydraulic pressure to the inlet port 22 of the valve mechanism which leads to the chamber 48. Before the depression of the treadle 1 it will be understood that the interior of the valve mechanism will have been in communication with the supply of liquid from the master cylinder 16 by reason of the fact that the liquid compensation valve 58, 59 will have been opened by the stop 63a. When, however, the treadle 1 is moved, as above referred to, the liquid compensation valve 58, 59 will be closed by the spring 61 due to the fact that the valve piston 49 will be moved upwardly away from the stop 63a. The upward movement of the valve piston 49 will then close the outlet or discharge valve 66, 67, thus lapping the same with the normally closed inlet valve 118, 119. Further upward movement of the lower valve piston 49, however, while retaining the outlet valve 66, 67 seated, will open the inlet valve 118, 119 to the desired extent, thus admitting the high pressure liquid which then flows downwardly through the flutings 116 to the delivery chamber 81, into the pressure-responsive cylinder 89 and thence through the delivery ports 33 and 24 to the wheel brake cylinders 28, 29, 37 and 38, to apply the desired amount of braking force according to the pressure applied. The degree of the pressure thus delivered to the brakes will, also, depress the plunger 86 coordinately, thus causing the travel-coordinating piston 94 to move downwardly, consequently increasing the volume in the conduit 21. In this way the degree of braking effort is always ascertainable by the driver due to the travel of the treadle 1, which is coordinate with the pressures delivered to the wheel brakes, while at the same time, of course, the treadle 1 has a "feel" of the degree of the pressures thus applied. At the same time, during the operation of the valve in this manner, the chamber 93 beneath the piston 94 will act not only as a breather but to carry off to the discharge port 43 any liquid that has leaked past the piston 94. For balancing purposes, the end 47' of the bore receiving the piston 122 is in communication with the discharge port 43 via passageways 46 and 47, which subjects the effective area of the piston 122 to return port pressure, providing a balanced valve since the lower end of the valve element 65 is also subject to return port pressure which is present in the chamber 64. Passages 46 and 47 appear in Fig. 6 which is a fragmentary sectional view taken through the valve housing adjacent the bore containing the movable valve element. These passages are arranged parallel to the bore.

A complete system for the control of an automobile, as disclosed in my co-pending application Serial No. 440,994, filed July 2, 1954, including a power steering system as well as a brake system, is shown in Fig. 9. For providing a source of high pressure liquid, the pump 150 is employed which may be driven by the vehicle engine. Pressure liquid is supplied to the brake system through the high pressure liquid line 42 leading from an accumulator 153 which serves to maintain the pressure liquid in the high pressure line substantially constant. From the brake system, the discharge or return line 45 leads to the accumulator through a line 155 and check-valve 156, the function of this check-valve being to maintain a residual pressure in the return lines 45, 155. In the system as shown, this residual pressure, of course, is a substantially lower pressure than is found in the high pressure line 42 leading to the brake system from the accumulator 153 and pump 150. The foregoing described system including the pump and accumulator, not only provides a source of high pressure liquid for actuation of the brake system, but also provides a residual pressure in the return line 45, 155 which, in conjunction with the liquid compensation means in the valve of the present invention, maintains the impulser line filled with fluid. In this latter aspect, the check-valve for holding a residual pressure is purely exemplary.

While I have described my invention above in detail I wish it to be understood that many changes may be made therein without departing from the spirit of the same.

I claim:

1. A control valve comprising a valve body having inlet, working and return ports, said inlet port and said return port being connected to a source of pressure fluid, a valve element in said body, means for actuating said valve element from the control line of a hydraulic impulser system for communicating the inlet port with the working port upon application of impulser pressure, and the working port with the return port upon release of impulser pressure, and a liquid compensating valve means associated with said control valve for communicating the return port of said control valve with the impulser line for transmitting fluid to maintain the control line filled, said liquid compensation valve means including a movably mounted operator subject to return port pressure and impulser line pressure and movable in response to the difference between said pressures and a liquid compensation valve element arranged to be opened by said operator upon a predetermined drop in said impulser line pressure.

2. A valve mechanism comprising a housing having a hydraulic inlet for a liquid received from an impulser under pressure, a hydraulic liquid delivery port, an inlet valve for controlling flow of pressure fluid derived from a source to said delivery port upon the application of impulser pressure, an outlet valve for controlling release of pressure fluid from said delivery port upon release of impulser pressure, said inlet and outlet valves being selectively operable, and a hydraulic plunger for operating the outlet valve, said plunger being movable relatively to and carrying a valve seat for the outlet valve, said hydraulic plunger having a liquid compensation valve through the same which is opened upon release of impulser pressure to allow pressure fluid to flow to said hydraulic inlet from said liquid delivery port.

3. A valve mechanism comprising a valve body, a hydraulic inlet therein for a liquid received from an impulser under pressure, hydraulic liquid inlet, working and return ports, an inlet valve for controlling flow of pressure fluid derived from a source to said working port upon application of impulser pressure, an outlet valve connected to operate the inlet valve when the outlet valve is closed, a hydraulic plunger for operating the outlet valve, movable relatively to and carrying a valve seat for the outlet valve, and a travel-coordinating chamber connected with said hydraulic inlet, and means for varying the volume of said chamber in accordance with the pressure at said working port, and said hydraulic plunger having a liquid compensation valve through the same which is opened upon release of impulser pressure to allow pressure fluid to flow to said hydraulic inlet from said working port.

4. A valve mechanism comprising a valve body, a hydraulic inlet therein for a liquid received from an impulser under pressure, hydraulic liquid inlet, working and return ports, an inlet valve for controlling flow of pressure fluid derived from a source to said working port upon application of impulser pressure, an outlet valve connected to operate the inlet valve when the outlet valve is closed, a hydraulic plunger for operating the outlet valve, movable relatively to and carrying a valve seat for the outlet valve, a travel-coordinating chamber connected with said hydraulic inlet, and means for varying the volume of said chamber in accordance with the pressure at said working port, said last-named means comprising a piston in said chamber, and a pressure responsive element in said valve body connected to said piston, said element being connected to be acted upon by the pressure at said working port for actuating said piston in accordance with said pressure, and a discharge port having a passageway to receive leakages from the travel-coordinating chamber, said hydraulic plunger having a liquid compensation valve through the same which is opened upon release of impulser pressure to allow pressure fluid to flow to said hydraulic inlet from said working port.

5. A valve mechanism comprising a valve body, a hydraulic inlet therein for the liquid received from an impulser under pressure, hydraulic liquid inlet, working and return ports, an inlet valve for controlling flow of pressure fluid derived from a source to said working port upon application of impulser pressure, an outlet valve for controlling return of pressure fluid from said working port upon release of impulser pressure, said inlet and outlet valves being selectively operable, a hydraulic plunger for operating the outlet valve, movable relatively to and carrying a valve seat for the outlet valve, a travel-coordinating chamber connected with said hydraulic inlet, and means for varying the volume of said chamber in accordance with the pressure at said working port, and a discharge port having passageways to receive leakages from the travel-coordinating chamber and from said inlet valve, said hydraulic plunger having a liquid compensation valve through the same which is opened upon release of impulser pressure to allow pressure fluid to flow to said hydraulic inlet from said working port.

6. A valve for use in a fluid pressure system comprising a valve body, an inlet port therein, working and return ports in the body, a plunger valve for selectively communicating the inlet port with the working port, and the return port with the working port, said body having a cylinder and an actuating plunger for said plunger valve, said actuating plunger being operated by an impulser connected to said valve body by means of an impulser hydraulic line, a liquid compensation valve associated with said actuating plunger means connecting the return port in said valve body and said impulser hydraulic line including said compensation valve, said compensation valve being arranged to be opened for transmitting fluid derived from said return port to said hydraulic impulser line upon release of impulser line pressure to maintain the control line filled with liquid from said fluid pressure system.

7. A valve for use in a fluid pressure system comprising a valve body, an inlet port therein, working and return ports in the body, a plunger valve apparatus for selectively communicating the inlet port with the working port, and the return port with the working port, said plunger valve apparatus being operated by an impulser connected to said valve body by an impulser hydraulic line, a travel-coordinating hydraulic piston in the body and subject to pressure at said working port, a spring acting between the body and the piston for controlling the travel of the piston according to the pressures applied, a plunger and cylinder in the body connected to the hydraulic piston and spring, and a hydraulic passage for communicating the fluid from the impulser hydraulic line to the plunger valve apparatus and to the cylinder so that the pressure at the working ports is controlled by the valve apparatus in accordance with the pressure in the impulser line and the volume of said cylinder is varied accordingly for imparting "feel" to the impulser.

8. A valve for use in a fluid pressure system comprising a valve body, an inlet port therein, working and return ports in the body, a plunger valve apparatus for selectively communicating the inlet port with the working port, and the return port with the working port, a travel-coordinating hydraulic piston in the body and movable in accordance with the pressures at said working port, a spring acting between the body and the hydraulic piston for controlling the travel of the piston according to the pressures applied, said body also having a cylinder and an actuating plunger for the plunger valve apparatus, said plunger valve apparatus being operated by an impulser connected to said valve body by an impulser hydraulic line, a plunger and cylinder in the body connected to the hydraulic piston and spring, and a hydraulic passage for communicating the fluid from the impulser hydraulic line to the cylinder and to the plunger valve apparatus so that the pressure in the working ports is controlled by the plunger valve apparatus in accordance with the pressure in the impulser line and the volume of the cylinder is varied accordingly to impart "feel" to the impulser.

9. A valve for use in a fluid pressure system comprising a valve body, an inlet port therein, working and return ports in the body, a plunger valve apparatus for selectively communicating the inlet port with the working port, and the return port with the working port, a hydraulic piston in the body and movable in accordance with the pressures at said working port, a spring acting between the body and the hydraulic piston for controlling the travel of the piston according to the pressures applied, said body also having a cylinder and an actuating plunger for the valve apparatus, said plunger valve apparatus being operated by an impulser connected to said valve body by an impulser hydraulic line, a plunger and cylinder in the body connected to the hydraulic piston and spring, said cylinder being in communication with said impulser line, and a hydraulic passage for communicating fluid from the impulser hydraulic line to the plunger valve apparatus so that the pressure in the working parts is controlled by the valve apparatus in accordance with the pressure of the fluid in said impulser line, means connecting the return port in said valve body and said impulser line including a compensator valve associated with said actuating plunger, said compensator valve being arranged to be opened by movement of the actuating plunger upon release of line pressure for transmitting fluid to the impulser line to maintain the impulser line filled.

10. A valve for use in a fluid pressure system comprising a valve body, inlet, working and return ports in the body, a poppet valve in the body subjected to inlet port pressure, means in the body having an opening therein to slidably receive a guide for the poppet valve, means in the valve body defining a seat for said poppet valve, means normally urging the poppet valve toward its seat to cut off communication between the inlet port and the other two ports, valve means in the body including a valve head carried by the poppet valve and a valve seat slidably movable in the body and with respect to the valve head for controlling communication between the working and return ports and normally arranged spaced from said valve head in an open position wherein to establish communication between the working and return ports, said valve seat being movable in a direction toward the valve head to close the valve, a balancing passage outside of the poppet valve and valve head, and means for moving said seat further in the same direction to urge the poppet valve away from its seat to establish communication between the inlet and the working port, said valve head being closed to cut off communication between the working and return ports, said poppet valve seat, opening, and valve head, having equal effective areas subject to inlet, return and working port pressures, whereby a hydraulically balanced poppet valve is obtained irrespective of the position of said poppet valve.

11. In a valve for use in a fluid pressure system, said valve having a valve body, a longitudinal bore in the valve body, and inlet, working and return ports spaced along said bore, the combination comprising, means in the valve body defining a fixed valve seat between the inlet and working ports, means in the valve body defining a movable valve seat between the working and return ports, an inlet valve head and a similarly shaped exhaust valve head, connected in alignment and arranged to seat on said fixed and movable valve seats respectively for forming inlet and exhaust valves, means in one end of the bore having an opening therein to receive a guide for the inlet valve head, said movable valve seat being slidably mounted in the other end of the bore for movement from a normal position spaced from the exhaust valve head toward and away from the valve heads, and being effective upon movement in a direction toward said valve heads to seat said exhaust valve head to close said exhaust valve, continued movement of said movable valve seat in the same direction being effective to unseat said inlet valve head for opening said inlet valve, means provided by said movable valve seat for guiding said exhaust valve head toward the movable valve seat upon such movement, a balancing passage for admitting pressure fluid derived from the return port to the guide for the inlet valve head, the effective seating areas of said inlet and exhaust valve heads and said fixed and movable valve seats and the cross-sectional area of said opening and valve guide being substantially equal, thereby providing a hydraulically balanced valve.

12. In a hydraulic control system, a source of high pressure fluid, a controlled device, a pressure transmitting system, valve means operated by said pressure transmitting system for regulating the flow of liquid from said source to said controlled device, means for deriving liquid at reduced pressure from said source, a liquid compensation valve means connected between said last named means and said pressure transmitting system in association with said valve means including an operator responsive to the difference in pressure therebetween and a valve element arranged to be opened by said operator upon a predetermined drop in pressure of liquid in said pressure transmitting system, to maintain the pressure transmitting system supplied with liquid obtained at said reduced pressure from the high pressure system.

13. In a valve for use in a fluid pressure system, the combination comprising a valve body having a longitudinal bore, inlet, working, and return ports spaced along said bore, means in said body defining a fixed valve seat between the inlet and working ports, means in said valve body defining a movable valve seat between the working and return ports, a poppet valve slidably mounted in said bore comprising an inlet valve head and an exhaust valve head connected axially thereof and arranged to seat on said fixed and movable valve seats respectively for forming inlet and exhaust valves, means carrying said inlet valve head and said exhaust valve head for movement longitudinally of the bore relative to their respective seats for controlling communication between the inlet, working, and return ports, including an opening in the valve body communicating with one end of the bore, and a member slidable in said opening, said member having a connection to said inlet valve head and said exhaust valve head that allows said exhaust valve head to move laterally relative to said member, means cooperative with said valve heads and their seats for guiding the same so as to provide accurate seating of the valve heads on the respective valve seats, the effective seating areas of said inlet and exhaust valve heads and said fixed and movable valve seats and the cross-sectional area of said opening and member being substantially equal, thereby providing a hydraulically balanced valve.

14. In a valve for use in a fluid pressure system, the combination comprising a valve body having a longitudinal bore, inlet, working, and return ports spaced along said bore, means in said body defining a fixed valve seat between the inlet and working ports, means in said valve body defining a movable valve seat between the working and return ports, a poppet valve slidably mounted in said bore comprising an inlet valve head and an exhaust valve head connected axially thereof and arranged to seat on said fixed and movable valve seats respectively for forming inlet and exhaust valves, means carrying said inlet valve head and said exhaust valve head for movement longitudinally of the bore relative to their respective seats for controlling communication between the inlet, working and return ports, said last named means including an opening in the valve body communicating with one end of the bore, and a member slidably mounted in said opening, said member having a connection to said exhaust valve head that allows movement of the latter relative to said member, said valve heads and their seats including means for guiding the same upon relative valve seating movement so as to provide accurate seating of the valve heads on the respective valve seats, the effective seating areas of said inlet and exhaust valve heads and said fixed and movable valve seats and the cross-sectional area of said opening and member being substantially equal, thereby providing a hydraulically balanced valve.

15. In a valve for use in a fluid pressure system, the combination comprising a multi-part valve body, the parts of said body having a registering longitudinal bore, an inlet port in one part of said body, and working and return ports in a second of said parts, said ports being spaced along said bore, means in said one part of said valve body defining a fixed valve seat between the inlet and working ports, means in said second part of said valve body defining a movable valve seat between the working and return ports, a poppet valve slidably mounted in said bore comprising an inlet valve head and an exhaust valve head connected axially thereof and arranged to seat on said fixed and movable valve seats respectively for forming inlet and exhaust valves, means in said one part of said valve body carrying said inlet valve head and said exhaust valve head for movement longitudinally of the bore relative to their respective seats for controlling communication between the inlet, working and return ports, said last named means including an opening in said one part of said valve body communicating with one end of the bore and a member slidably mounted in said opening, said member having a connection to said inlet and exhaust valve heads that allows movement of the latter relative to said member and its valve seat, said valve heads and their seats including means for guiding the same into alignment upon relative valve seating movement, the effective seating areas of said inlet and exhaust valve heads and said fixed and movable valve seats being substantially equal, thereby providing a hydraulically balanced valve.

16. In a valve for use in a fluid pressure system, the combination comprising a multi-part valve body, the parts of said body having a registering longitudinal bore, a valve element movably mounted in said bore, means in one part of said body defining a movable valve seat for said valve element, means in a second part of said valve body carrying said valve element for movement longitudinally of the bore relative to said seat, said last named means including an opening in said one part of said valve body communicating with one end of the bore and a member slidably mounted in said opening, said member having a connection to said valve element that allows movement of the latter relative to said member and said valve seat, said valve element and said seat including means for guiding the same into alignment upon relative valve seating movement, the effective seating areas of said element and valve seat and said opening being substantially equal, thereby providing a hydraulically balanced valve.

References Cited in the file of this patent

UNITED STATES PATENTS

| | | |
|---|---|---|
| 775,929 | O'Meara | Nov. 29, 1904 |
| 881,871 | Rice | Mar. 10, 1908 |
| 1,812,816 | Weaver | June 30, 1931 |
| 1,962,857 | Cash | Jan. 12, 1934 |
| 2,004,078 | McDougal | June 4, 1935 |
| 2,019,193 | Mueller | Oct. 25, 1935 |
| 2,185,449 | Veenschoten | Jan. 2, 1940 |
| 2,352,344 | Rockwell | June 27, 1944 |
| 2,367,194 | Boldt | Jan. 16, 1945 |
| 2,459,456 | Rockwell | Jan. 18, 1949 |
| 2,484,888 | Hollerith | Oct. 18, 1949 |
| 2,631,433 | Thomas | Mar. 17, 1953 |
| 2,631,795 | Schultz | Mar. 17, 1953 |
| 2,752,947 | Hruska | July 3, 1956 |
| 2,787,255 | Mercier | Apr. 2, 1957 |